Feb. 19, 1963  W. VOLKRODT  3,078,381
PERMANENT MAGNET ROTOR FOR A DYNAMOELECTRIC MACHINE
Filed Dec. 3, 1959

United States Patent Office 3,078,381
Patented Feb. 19, 1963

3,078,381
PERMANENT MAGNET ROTOR FOR A
DYNAMOELECTRIC MACHINE
Wolfgang Volkrodt, Bad Neustadt, Germany, assignor to Siemens-Schuckertwerke Aktiengesellschaft, Erlangen, Germany, a corporation of Germany
Filed Dec. 3, 1959, Ser. No. 856,991
6 Claims. (Cl. 310—156)

The present invention relates to synchronous dynamoelectric machines and, more particularly, to synchronous motors of the permanent magnet type.

For drives of smaller rating in applications which require a constant speed independent of the load, the conventional synchronous motor having direct current excitation winding and slip rings is too expensive and too susceptible to faults. The reluctance motor which is formed from an asychronous motor by providing the rotor thereof with polar projections, has a poor power factor and little applicability. It is known in the art to excite a synchronous motor by means of permanent magnets, thereby to improve power factor. Thus, it has been proposed to provide permanent magnets in the rotor, partially having slots therein, of an asychronous machine. In hysteresis motors which are economical only in very small ratings, a permanent magnet of high permeability and low coercive force rotates directly in the stator of an alternating current machine. With all of these prior art systems, the permanent magnets are so arranged that the magnetic flux extends radially or, in part, tangentially in the permanent magnet. In view of restricted radial dimensions, it is necessary to use permanent magnets having a high permeability in order to obtain a high magnetic flux, and accordingly, high torque. At the asychronous start of such a motor, the permanent magnet is subjected to strong demagnetization forces from the main field of the stator, and therefore, the permanent magnets employed must have not only a high permeability but a very high coercive force. The magnets heretofore used, for example, Alnico, met the requirements as far as the permeability is concerned, but when in a synchronous motor, they usually are not stable enough with respect to demagnetization. Therefore, synchronous motors excited by permanent magnets have been previously used only in a few special applications.

The principal object of the present invention is to provide a permanent magnet rotor for a dynamoelectric machine which is insensitive to demagnetization forces and which is of simple and inexpensive construction.

Another object of the invention is to provide a permanent magnet rotor for dynamoelectric machines which is of simple and economical construction and which utilizes axially magnetized permanent magnets laterally disposed adjacent a rotor core establishing a magnetic flux path which, after being radially diverted extends through the rotor, through the air gap, radially through the stator core and tangentially through the stator yoke.

A further object of the invention is to provide a permanent magnet rotor for synchronous dynamoelectric machines utilizing a ceramic magnet having a high coercive force.

A still further object of the invention is to provide a permanent magnet rotor for dynamoelectric machines having a plurality of cores and axially magnetized permanent magnets arranged side by side on a common shaft in which the magnets are insensitive to demagnetization forces.

Other objects and advantages of the invention will be apparent from the following detailed description, taken in connection with the accompanying drawing, in which.

Figure 1:
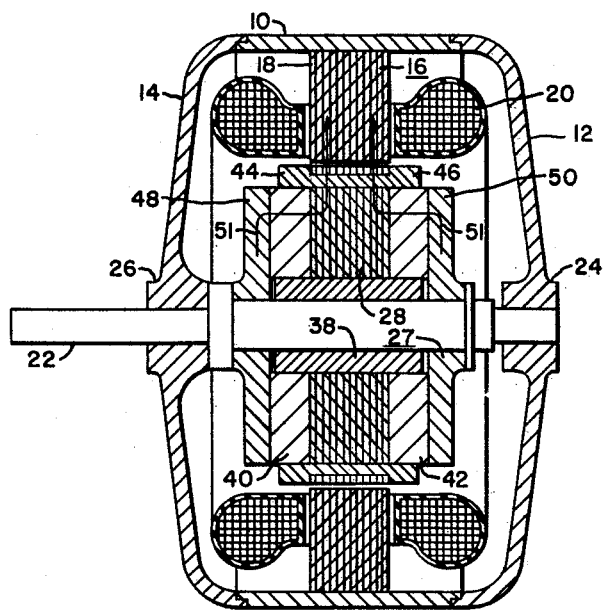
FIGURE 1 is a longitudinal section showing an embodiment of a motor incorporating the invention.

The invention as shown in the drawing is embodied in a synchronous induction motor utilizing a permanent magnet rotor having four poles, although it will be apparent that the invention is applicable to machines having any number of poles and intended for use in any type of synchronous dynamoelectric machine.

Figure 3A:
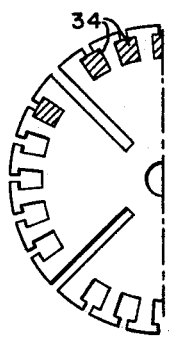
FIG. 3a is a partial side elevational view of a rotor core lamination utilized in this invention shown in an intermediate stage of manufacture.
Figure 3B:
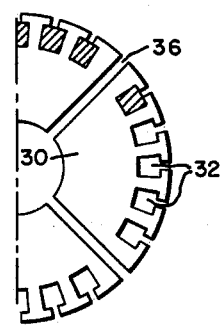
FIG. 3b is a partial side elevational view of a rotor core lamination utilized in this invention in its final form.

In FIG. 1 there is shown a synchronous induction motor having a frame 10 enclosed by end brackets 12 and 14. The motor frame 10 and end brackets 12 and 14 are of conventional construction. A stator member 16 comprising a stator core 18 and stator winding 20 is of the type used in a conventional induction motor. A shaft 22 is rotatably supported in end brackets 12 and 14. End brackets 12 and 14 include central bearing journals 24 and 26 in which the shaft 22 is journaled. A sleeve 38 of non-magnetic material is press fitted on the shaft 22. A rotor member 27 is shown secured to the shaft 22. The rotor member 27 includes a laminated rotor core 28, a pair of ring magnets 40 and 42 laterally adjacent the rotor core 28, short circuiting rings 44 and 46 encircling the magnets 40 and 42, respectively, and end discs 48 and 50 adjacent the ring magnets 40 and 42, respectively. The rotor core 28 includes a plurality of circumferentially spaced segments 30 as best seen in FIG. 3. The rotor core 28 is of a magnetic material and has a plurality of circumferentially spaced conductor slots 32 around its periphery. Received in the conductor slot 32 are cast conductors 34 which may be of copper, aluminum or any suitable conductor material. The short circuiting rings 44 and 46 connect the conductor bars 34 to provide a conventional squirrel cage winding. The segments 30 are separated by non-magnetic slots which may be as shown in the drawing or may be filled with suitable non-magnetic material, if desired. The punched lamination has a configuration as shown in FIG. 3a. The segments are magnetically separated from each other as by increasing diameter of the central bore as seen in FIG. 3b. The diameter of the central bore on the finished rotor core coincides with the roots of the separating slots 36. The diameter of the bore is increased to its final size after the conductor bars are in place thereby enabling the rotor to be held together.

If the motor shaft 22 is of magnetic material, it is desirable to use a sleeve 38 of non-magnetic material to prevent an undesirable magnetic shunt. The rotor core 28 is press fitted on the sleeve 38 or secured in any suitable manner. The sleeve 38 may be omitted if the shaft 22 be formed of non-magnetic material.

Figure 2:
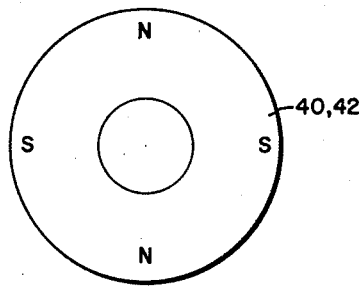
FIG. 2 is a side elevational view of a ring magnet utilized in the invention.

As shown in the drawings, the core 27 has four magnetically separated segments. These segments correspond to the number of poles on the stator. Any desired number of segments may be employed to correspond with any desired number of poles on the stator. It will be understood, of course, that a four pole synchronous induction motor is shown by way of example only. A pair of axially magnetized permanent magnets 40 and 42 are press fitted on the sleeve 38 axially adjacent the core 27. One of the magnets 40 and 42 is disposed on each lateral face of the core 28. The magnets 40 and 42 may be of any suitable material having the proper permeability and coercive force and having the proper dimensions to provide the flux required. However, preferably, the material employed for the magnets is one of the alkaline earth oxides or ferro-magnetic oxides such as $BaO \cdot 6Fe_3O_2$, commonly referred to as barium ferrite. This is a hard ceramic magnetic material. These oxides have a high permeability and high coercive force. The magnet is alternately magnetized in an axial direction with north and south poles as shown in FIG. 2 so as to have the required number of poles.

Short circuiting rings 44 and 46 encircle the permanent magnets 40 and 42. The magnet circuit is closed through two end discs 48 and 50 each one being axially disposed adjacent the lateral side of the ring magnets 40 and 42 remote from the core 28. These end discs 48 and 50 also serve to hold the entire rotor member 27 in axially assembled relation so that the reluctance at the joint areas and within the conventional laminated rotor is maintained at a minimum. Use of ceramic permanent magnets having a low flux density and high field strength results in a magnetic potential drop of a tolerable magnitude with the flux extending transverse of the rotor laminations. The separating grooves 36 between the rotor segments should be so dimensioned that the magnetic flux is at a minimum upon synchronous operation of the motor and can increase to such an extent upon the start of the motor and upon a momentary opposition between the stator main field and the field of the permanent magnet that the permanent magnet will not be demagnetized to an objectionable extent.

Thus, there has been described a synchronous induction machine which starts as an asynchronous induction machine due to the interaction of the stator rotating field with the bars of the squirrel cage rotor. Near synchronous speed, the rotating field induced by the stator and the permanent magnet field become so interlocked that the magnetic energy of the system is at a minimum. The rotor falls into step and the machine operates as a synchronous machine. A machine of this type may also be operated to function as a synchronous generator wherein, particularly by means of ceramic magnets, a satisfactory voltage stability and a capacity for carrying overloads is obtained. Machines built according to the invention may be connected together to form gang synchronous drives and selsyn drives as well as electrical differentials which have the advantage over conventional drives of dispensing with the usual slip rings.

In the machine illustrated and described, the magnetic flux extends first axially into the rotor core 27 which is divided into segments by grooves 36, according to the number of poles, is then radially diverted, and then passed through the air gap into the stator 18 of the machine, finally returning with a displacement of one pole pitch, through another rotor segment to the permanent magnet. The magnetic circuit is closed by short circuiting discs 48 and 50 disposed laterally of the magnetic rings 40 and 42, respectively. This is shown by the arrows 51.

Figure 4:
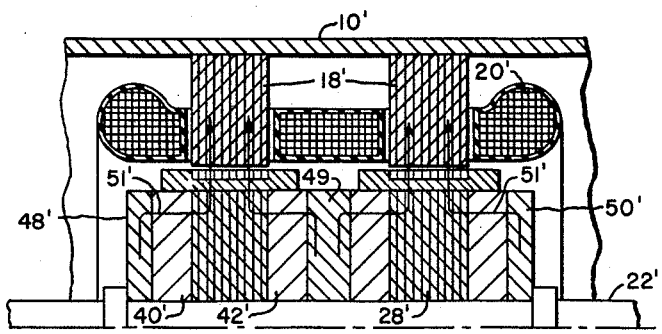
FIG. 4 is a partial longitudinal section showing a modified embodiment of this invention.

In order to obtain greater outputs for any given radial dimensions of the machine, the embodiment illustrated in FIG. 4 may be employed. In this embodiment, a plurality of partial stator cores 18' are received in the frame 10'. Each of the cores 18' has a winding 20'. A rotor core 28' similar to the core 28 is provided for rotation within each of the stator cores 18'. Axially magnetized ring magnets 40' and 42' are disposed axially adjacent each of the rotor cores 28' on each side thereof as in the FIG. 1 embodiment.

Short circuiting discs 48' and 50' are employed at each end of the stack of rotor cores and magnets. Short circuiting discs 49' are employed intermediate adjacent magnets. In the FIG. 4 embodiment, the sleeve corresponding to non-magnetic sleeve 38 is omitted and the shaft 22' is of a non-magnetic material.

Thus, in FIG. 4 there is shown a synchronous induction motor useful for obtaining greater outputs for any given radial dimension of the machines by employing several magnet systems disposed side by side upon the rotor shaft and in which the stator structure is composed of a plurality of partial stators. The use of a sleeve corresponding to sleeve 38 becomes superfluous in the FIG. 4 embodiment where the shaft is made of magnetic material.

The operation of the motor in FIG. 4 is identical to the operation of the motor shown in FIG. 1. The magnetic flux extends first axially into each of the radial cores which are divided into segments by grooves as in the FIG. 1 embodiment according to the number of poles and it is then radially diverted as shown by arrows 51'. The flux then passes through the air gaps between rotor cores and the corresponding stators to finally return with the displacement of one pole face through another rotor segment and back to the permanent magnet. The magnetic circuit is closed by short circuiting discs 48', 49' and 50' disposed laterally of the magnetic ring. In each embodiment, the synchronous machine incorporating the teachings of the invention starts as an asynchronous machine due to the interaction of the stator rotating field with the bars of the squirrel cage rotor. Near synchronous speed, the rotating field induced by the stator and the permanent magnet field becomes so interlocked that the magnetic energy of the system is at a minimum. The rotor falls into step and the machine operates as a synchronous motor.

It will be evident that a construction has been provided which makes it possible to assemble the rotor in a simple and relatively inexpensive manner by use of standard tools and manufacturing methods which are used in the production of conventional squirrel cage rotors. The cast cage structure rigidly holds the magnets and rigidly holds the core in place. A solid rugged construction results with no parts which can loosen in service. The cage structure serves a dual purpose since it not only holds the parts of the assembly in place but serves as a damper winding so that a very effective but simple and inexpensive structure is provided. The utilization of axially magnetized permanent magnets having high coercive force and stability provides a simple and inexpensive construction which is insensitive to the demagnetization to which it is subjected upon start of the motor and upon the momentary opposition between the stator main field and the field of the permanent magnets. It will be understood that certain modifications can be made within the scope of the invention, as for example external rotor type motors may be used wherein the rotor together with the permanent magnet system rotates about the stator with its stator winding. Other modifications may, of course, be made within the scope of this invention.

It will be understood that although a specific embodiment of the invention has been shown and described for the purpose of illustration, various modifications may be made within the scope of the invention, and the invention is not restricted to the specific details shown, but includes all equivalent embodiments and modifications.

I claim as my invention:

1. In a synchronous dynamoelectric machine having a stator member and a rotor member, the rotor member comprising a core of magnetic material having circumferentially spaced slots, a squirrel cage winding supported in said slots, said core being divided into magnetically separated segments by radial slots filled with non-magnetic material, an axially magnetized ring magnet disposed axially adjacent said core and means for providing a magnetic return path disposed axially adjacent said permanent magnet.

2. In a synchronous dynamoelectric machine having a stator member and a rotor member, the rotor member comprising a core of magnetic material having circumferentially spaced slots, a squirrel cage winding supported in said slots, said core being divided into magnetically separated segments by radial slots filled with non-magnetic material, and a pair of axially magnetized ring magnets disposed axially adjacent said core, said magnets having poles of opposite polarities alternately disposed circumferentially, one of said magnet pair disposed on each side of said core.

3. In a synchronous dynamoelectric machine having a stator member and a rotor member, the rotor member comprising a core of magnetic material having circumferentially spaced slots, a squirrel cage winding supported in said slots, said core being divided into magnetically separated segments by radial slots filled with non-magnetic material, a pair of axially magnetized ring magnets disposed axially adjacent said core, said magnets having poles of opposite polarities alternately disposed circumferentially, one of said pair disposed on each side of said core and means for providing a magnetic return path disposed axially adjacent each of said permanent magnets.

4. In a synchronous dynamoelectric machine having a stator member and a rotor member, said stator member having a plurality of stator cores disposed axially adjacent each other, each of said stator cores having a stator winding thereon, said rotor member comprising a plurality of rotor cores axially spaced from each other and each disposed to rotate within one of said stator cores, a plurality of axially magnetized ring magnets, a plurality of short circuiting discs of magnetic material providing a magnetic return path, one of said ring magnets disposed axially adjacent said cores on each side and one of said short circuiting discs disposed axially adjacent said ring magnets.

5. In a synchronous dynamoelectric machine having a stator member and a rotor member, said stator member having a plurality of stator cores disposed axially adjacent each other, each of said stator cores having a stator winding therein, said rotor member comprising a plurality of rotor cores axially spaced from each other and each disposed to rotate within one of said stator cores, a plurality of axially magnetized ceramic ring magnets, said magnets having circumferentially disposed magnetic poles, adjacent poles being of opposite polarity on each side of the disc, a plurality of short circuiting discs of magnetic material providing a magnetic return path, one of said ring magnets disposed axially adjacent said cores on each side and one of said short circuiting discs disposed axially adjacent said ring magnets.

6. In a synchronous dynamoelectric machine having a stator member and a rotor member, said stator member having a plurality of stator cores disposed axially adjacent each other, each of said stator cores having a stator winding thereon, said rotor member comprising a plurality of rotor cores of magnetic material, each of said rotor cores having circumferentially spaced slots, a squirrel cage winding supported in the slots of each of said cores, each of said cores being divided into magnetically separated segments by radial slots filled with non-magnetic material, a plurality of axially magnetized ring magnets, a plurality of short circuiting discs of magnetic material forming a magnetic return path, each of said rotor cores disposed for rotation within one of said stator cores, one of said ring magnets disposed axially adjacent one side of each of said rotor cores and a short circuiting disc in axial juxtaposition with each ring magnet.

References Cited in the file of this patent

UNITED STATES PATENTS

| | | |
|---|---|---|
| 1,947,269 | Leibing | Feb. 13, 1934 |
| 2,006,792 | Cox | July 2, 1935 |
| 2,120,109 | Merrill | June 7, 1938 |
| 2,442,626 | Tolson et al. | June 1, 1948 |